United States Patent
Jin et al.

(10) Patent No.: US 7,829,635 B2
(45) Date of Patent: Nov. 9, 2010

(54) COMPOSITION OF RESIN BASED ON POLYOLEFIN WITH IMPROVED SURFACE PRINTABILITY

(75) Inventors: Yang Seog Jin, Seongnam-si (KR); Seong Ki Park, Yongin-si (KR); Chang Woo Jin, Gunpo-si (KR); Chan Ki Lee, Gwangmyeong-si (KR); Se Hyun Cho, Seongnam-si (KR)

(73) Assignee: Polymersnet Co., Ltd., Siheung-Si, Gyeonggi-Do (KR)

( * ) Notice: Subject to any disclaimer, the term of this patent is extended or adjusted under 35 U.S.C. 154(b) by 932 days.

(21) Appl. No.: 11/312,668

(22) Filed: Dec. 20, 2005

(65) Prior Publication Data

US 2006/0189735 A1 Aug. 24, 2006

(30) Foreign Application Priority Data

Feb. 24, 2005 (KR) .................. 10-2005-0015420

(51) Int. Cl.
*C08L 33/10* (2006.01)
*C08K 5/095* (2006.01)

(52) U.S. Cl. .................. 525/222; 525/191; 525/224; 525/240; 525/221; 524/515; 524/394; 524/425; 524/451

(58) Field of Classification Search .......... 525/191, 525/224, 240, 222, 221; 524/515, 394, 425, 524/451
See application file for complete search history.

(56) References Cited

U.S. PATENT DOCUMENTS

| | | | | |
|---|---|---|---|---|
| 3,085,082 | A | * | 4/1963 | Baer et al. .................. 525/239 |
| 3,410,391 | A | * | 11/1968 | Kanter .................. 206/1.5 |
| 3,410,931 | A | | 11/1968 | Johnson |
| 4,728,692 | A | | 3/1988 | Sezaki et al. |
| 4,863,995 | A | | 9/1989 | Murakami et al. |
| 5,095,063 | A | | 3/1992 | Okada et al. |
| 5,331,046 | A | | 7/1994 | Chang et al. |
| 5,494,745 | A | | 2/1996 | Vander Velden et al. |
| 5,981,665 | A | | 11/1999 | Vestberg et al. |
| 6,433,088 | B1 | | 8/2002 | Saraf |
| 6,455,602 | B1 | | 9/2002 | Maki et al. |
| 6,869,653 | B2 | * | 3/2005 | Ling et al. .................. 428/36.9 |
| 2006/0183864 | A1 | | 8/2006 | Jin et al. |
| 2006/0189761 | A1 | | 8/2006 | Jin et al. |

FOREIGN PATENT DOCUMENTS

| | | |
|---|---|---|
| EP | 0632071 A2 | 1/1995 |
| JP | 58-198529 A | 11/1983 |
| JP | 61-272217 A | 12/1986 |
| JP | 04-270708 | 9/1992 |
| JP | 05-194843 A | 8/1993 |
| JP | 06-065438 A | 3/1994 |
| JP | 06-184212 A | 7/1994 |
| JP | 07-008903 A1 | 1/1995 |
| JP | 2001-310424 | 6/2001 |
| JP | 13-310424 A | 11/2001 |
| JP | 2003-313332 A | 11/2003 |
| JP | 2004-51808 A | 2/2004 |
| JP | 2004-161946 | 6/2004 |
| KR | 10-1993-12944 | 7/1993 |
| KR | 10-1993-12944 A1 | 7/1993 |
| KR | 10-1995-0007662 | 7/1995 |
| KR | 10-1995-0007662 B1 | 7/1995 |
| KR | 10-2000006809 A | 11/2000 |
| KR | 10-2001-0009459 A | 2/2001 |
| KR | 10-0395399 | 8/2003 |
| KR | 10-0395399 B1 | 8/2003 |
| KR | 10-2007-0048816 | 5/2007 |
| WO | 00/36011 A | 6/2000 |
| WO | 2006/075906 A1 | 7/2006 |

OTHER PUBLICATIONS

International Search Report issued in PCT/KR2006/000607 and dated May 29, 2006.

* cited by examiner

*Primary Examiner*—Ling-Siu Choi
(74) *Attorney, Agent, or Firm*—Lucas & Mercanti, LLP; Klaus P. Stoffel

(57) ABSTRACT

The present invention relates to a polyolefin-based resin composition for the calendering process which can be directly printed without applying an adhesive since the surface printability is improved.

The present invention provides a polyolefin-based resin composition for the calendering process comprising: 3 to 95 weight percent, based on total weight of said polyolefin-based resin composition, of a high impact polyolefin resin; 1 to 50 weight percent, based on total weight of said polyolefin-based resin composition, of an acrylate functional polymer; 1 to 30 weight percent, based on total weight of said polyolefin-based resin composition, of a polyolefin-based thermoplastic elastomer; 1 to 50 weight percent, based on total weight of said polyolefin-based resin composition, of a mineral filler; and 0.1 to 5.0 weight percent, based on total weight of said polyolefin-based resin composition, of a lubricant.

By the present invention, it is possible to remarkably improve the surface printability of the polyolefin-based sheet or film and thereby, to achieve direct printing without need of an adhesive. Also, since a production line for applying an adhesive is not needed, it is possible to reduce the production cost and to increase productivity. Further, the present invention can substitute for decoration sheets, printing papers, labels and the like which have been composed of PVC and thus, is environmentally friendly.

20 Claims, No Drawings

COMPOSITION OF RESIN BASED ON POLYOLEFIN WITH IMPROVED SURFACE PRINTABILITY

BACKGROUND OF THE INVENTION

1. Field of the Invention

The present invention relates to a polyolefin-based resin composition. More particularly, it relates to a polyolefin-based resin composition for the calendering process with improved surface printability, which can be directly printed without application of an adhesive.

2. Background of the Related Art

When the surface of a conventional polyolefin-based resin composition for the calendering process is printed with a commercially available ink or paint, the printing layer and the calendered substrate are seriously peeled off from each other, whereby it is necessary to apply an adhesive, which is called a primer, for printing.

The conventional polyolefin-based resins for the calendering process cannot be surface-printed without application of an adhesive and thus, the processing plant indispensably include an adhesive applying line. This means addition of an expensive processing facility and cost increase of raw materials for an adhesive.

Therefore, it has been urgently desired to develop a polyolefin-based resin, upon the surface of which printing can be readily performed without use of an adhesive.

Korean Patent Application No. 2000-0044677 disclosed a polypropylene-based composition for decoration sheet which can be applied to the calendering process, and a method for preparing a polypropylene film and sheet using the same. However, it had a problem in that the printing cannot be performed without a primer.

Also, Korean Patent Application No. 2004-0034987 disclosed a synthetic resin for a top coating of a decoration sheet which is environmentally friendly and can be adhered without an adhesive. However, it had problems in that it cannot be applied to the calendering process, causing significant deterioration in productivity.

SUMMARY OF THE INVENTION

Thus, the present invention has been made in order to solve the problems involved in the prior art, and it is an object of the present invention to provide a polyolefin-based resin composition for the calendering process which has surface printability improved remarkably and thereby, can be directly printed without need of an adhesive.

To achieve the above object, in one embodiment, the present invention provides a polyolefin-based resin composition for the calendering process comprising:

3 to 95 weight percent, based on total weight of said polyolefin-based resin composition, of a high impact polyolefin resin;

1 to 50 weight percent, based on total weight of said polyolefin-based resin composition, of an acrylate functional polymer;

1 to 30 weight percent, based on total weight of said polyolefin-based resin composition, of a polyolefin-based thermoplastic elastomer;

1 to 50 weight percent, based on total weight of said polyolefin-based resin composition, of a mineral filler; and 0.1 to 5.0 weight percent, based on total weight of said polyolefin-based resin composition, of a lubricant.

DETAILED DESCRIPTION OF THE PREFERRED EMBODIMENT

Now, the present invention is described in detail.

The present invention comprises a polar polymer which is compatible with conventional polyolefin resins, has a better fluidity than the conventional polyolefins and is provided with a functional group.

Examples of the high impact polyolefin resin comprise high impact polyethylene resins, high impact polypropylene resins and the like, with the high impact polypropylene resins being particularly preferred.

preferably the high impact polyolefin resin has a melt index of 0.1 to 5.0 (g/10 min, 230° C./2.16 kg). If the melt index is less than 0.1, processability is deteriorated, causing reduction of productivity, and if it exceeds 5.0, printability is deteriorated.

The content of the high impact polyolefin resin is 3 to 95% by weight, preferably 40 to 80% by weight based on the total weight of the polyolefin-based resin composition. If it is less than 3% by weight based on the total weight of the polyolefin-based resin composition, impact strength is deteriorated and if it exceeds 95% by weight based on the total weight of the polyolefin-based resin composition, printability is deteriorated.

The acrylate functional polymer plays the role of an adhesive which is used in the surface printing of the conventional polyolefin-based resins.

Preferably, the acrylate functional polymer which can be used in the present invention comprises acrylate copolymer/polyolefins, wherein the polyacrylate copolymer is dispersed in the polyolefin.

Preferably the acrylate component of the acrylate copolymer comprises at least two acrylates selected from the group consisting of methylacrylate, ethylacrylate, propylacrylate, butylacrylate, hexylacrylate, ethylhexylacrylate, octadecylacrylate, methylmethacrylate, ethylmethacrylate, propylmethacrylate, butylmethacrylate, hexylmethacrylate, ethylhexylmethacrylate, octadecylmethacrylate and hydroxyalkylacrylate, but is not limited thereto.

Preferably the content of the acrylate monomer in the acrylate functional polymer is 2 to 98% by weight based on the total weight of the acrylate functional polymer.

The content of the acrylate functional polymer is 1 to 50% by weight, preferably 5 to 30% by weight based on the total weight of the polyolefin-based resin composition. If the content is less than 1% by weight based on the total weight of the polyolefin-based resin composition, printability is deteriorated and if it exceeds 50% by weight based on the total weight of the polyolefin-based resin composition, mechanical properties and processability are deteriorated.

The acrylate functional polymer has a melt index of 3.0 to 100.0 (g/10 min, 230° C./2.16 kg). If the melt index is less than 3.0, surface printability is deteriorated due to the reduction of fluidity and if it exceeds 100.0, the sheet processing is difficult to be done.

The polyolefin-based thermoplastic elastomer takes charge of controlling hardness and impact strength.

The polyolefin-based thermoplastic elastomer comprises, for example, at least one elastomer selected from the group consisting of (1) ethylene-butene copolymer using a metallocene catalyst, wherein the content of the butene comonomer is 1 to 50 weight percent based on total weight of said ethylene-butene copolymers said ethylene-octene copolymer, (2) ethylene-octene copolymer using a metallocene catalyst, wherein the content of the octene comonomer is 1 to 50 weight percent based on total weight of said ethylene-octene copolymer, and (3) ethylene-acrylate copolymer, wherein the acrylate comonomer comprises methylacrylate, ethylacrylate, or butylacrylate and the content of the acrylate comonomer is 1 to 50 weight percent based on total weight of ethylene-acrylate copolymer.

The content of the polyolefin-based thermoplastic elastomer is 1 to 30% by weight, preferably 5 to 25% by weight based on the total weight of the polyolefin-based resin composition. If it is less than 1% by weight based on the total weight of the polyolefin-based resin composition, impact strength is deteriorated and if it exceeds 30% by weight based on the total weight of the polyolefin-based resin composition, stiffness is deteriorated.

Preferably the polyolefin-based thermoplastic elastomer has a melt index of 0.1 to 20.0 (g/10 min, 190° C./2.16 kg). If the melt index is less than 0.1, compatibility with other materials is deteriorated and if it exceeds 20.0, the sheet processing is difficult.

The mineral filler comprises, but is not limited to at least one filler selected from the group consisting of talc, calcium carbonate, clay and titanium dioxide, with talc being preferred.

The mineral filler is used to supplement mechanical properties and reduce production cost. The amount of the mineral filler used is 1 to 50% by weight, preferably 10 to 50% by weight based on the total weight of the polyolefin-based resin composition. If it is less than 1% by weight based on the total weight of the polyolefin-based resin composition, the mechanical properties are deteriorated and the production cost is increased, and if it exceeds 50% by weight based on the total weight of the polyolefin-based resin composition, there are problems in terms of the processing.

Usable examples of the lubricant is at least one lubricant selected from the group consisting of calcium stearate, zinc stearate, lead stearate and potassium stearate, but is not limited thereto, with calcium stearate and zinc stearate being preferred. The lubricant acts as a lubricating agent in the process. The amount of lubricant used is 0.1 to 5.0% by weight, preferably 0.1 to 3.0% by weight based on the total weight of the polyolefin-based resin composition. If the used amount is less than 0.1% by weight based on the total weight of the polyolefin-based resin composition, lubricating effect is reduced in terms of processibility, and if it exceeds 5.0% by weight based on the total weight of the polyolefin-based resin composition, surface migration occurs on the sheet surface.

Now, the present invention is explained in further detail using the examples. However, it should be understood that the examples are only for illustrative purpose and the present invention is not limited thereto.

EXAMPLE 1

To 60% by weight of a high impact polypropylene having a melt flow index of 0.6 g/10 min (230° C., 2.16 kg) as a high impact polyolefin resin, 14% by weight of talc and 1% by weight of calcium stearate were added, 22% by weight of an ethylene-methylacrylate copolymer having a melt flow index of 2.4 g/10 min (190° C., 2.16 kg) as a polyolefin-based thermoplastic elastomer was added, and 3% by weight of a polyacrylate copolymer/polypropylene based functional polymer additive, produced by Polymersnet Co., Ltd. (Korea), as an acrylate functional polymer was added, followed by mixing thoroughly for dispersion. The extruder temperature from a feeder part to a die was set to 160° C. to 240° C. and the mixture was compounded. The polyacrylate copolymer was a copolymer of butylacrylate, hydroxypropylacrylate and methylmethacrylate, dispersed in polypropylene.

Then, the injection molding machine temperature from the feeder to a nozzle was set to 230° C. to 250° C. for the printing test and a specimen for the printing test was prepared.

The printability of the printing test specimen was examined by the Peel-Off test method. This test method was performed by the Peel-Off test method according to ISO 2409.

The result of the printability test is shown in Table 1.

EXAMPLE 2

The same procedure as in Example 1 was followed, except that the ethylene-methylacrylate copolymer was used in an amount of 15% by weight and the acrylate functional polymer was used in an amount of 10% by weight.

The result of the printability test is shown in Table 1.

EXAMPLE 3

The same procedure as in Example 1 was followed, except that the ethylene-methylacrylate copolymer was used in an amount of 10% by weight and the acrylate functional polymer was used in an amount of 15% by weight.

The result of the printability test is shown in Table 1.

EXAMPLE 4

The same procedure as in Example 1 was followed, except that the ethylene-methylacrylate copolymer was used in an amount of 5% by weight and the acrylate functional polymer was used in an amount of 20% by weight.

The result of the printability test is shown in Table 1.

COMPARATIVE EXAMPLE 1

The same procedure as in Example 1 was followed, except that the ethylene-methylacrylate copolymer was used in an amount of 24.5% by weight and the acrylate functional polymer was used in an amount of 0.5% by weight.

The result of the printability test is shown in Table 1.

TABLE 1

| | Comp. Ex. 1 | Ex. 1 | Ex. 2 | Ex. 3 | Ex. 4 |
|---|---|---|---|---|---|
| High impact Polypropylene | 60 | 60 | 60 | 60 | 60 |
| Ethylene-methylacrylate copolymer | 24.5 | 22 | 15 | 10 | 5 |
| Acryl functional Polymer | 0.5 | 3 | 10 | 15 | 20 |
| Talc | 14 | 14 | 14 | 14 | 14 |
| Calcium stearate | 1 | 1 | 1 | 1 | 1 |
| Printability | Poor | Good | Good | Good | Good |

In Table 1, the numbers are expressed in % by weight.

By the present invention, it is possible to remarkably improve the surface printability of the polyolefin-based sheet or film and thereby, to achieve direct printing without need of an adhesive. Also, since a production line for applying an adhesive is not needed, it is possible to reduce the production cost and to increase productivity.

Further, the present invention can substitute for decoration sheets, printing papers, labels and the like which have been composed of PVC and thus, is environmentally friendly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A polyolefin-based resin composition for the calendering process comprising:
   (a) 3 to 95 weight percent of a high impact polyolefin resin;
   (b) 1 to 50 weight percent of an acrylate functional polymer;
   (c) 1 to 30 weight percent of a polyolefin-based thermoplastic elastomer;
   (d) 1 to 50 weight percent of a mineral filler; and
   (e) 0.1 to 5.0 weight percent of a lubricant
   wherein the acrylate functional polymer comprises an acrylate copolymer;
   wherein the acrylate copolymer comprises at least two acylates selected from the group consisting of methylacrylate, ethylacrylate, propylacrylate, butylacrylate, hexylacrylate, ethylhexylacrylate, octadecylacrylate, methylmethacrylate, ethylmethacrylate, propylmethacrylate, butylmethacrylate, hexylmethacrylate, ethylhexylmethacrylate, octadecylmethacrylate and hydroxyalkylacrylate; and
   wherein the weight percentages are based on the total weight of the polyolefin-based resin composition.

2. The composition according to claim 1, wherein the high impact polyolefin resin comprises a high impact polyethylene resin or a high impact polypropylene resin.

3. The composition according to claim 1, wherein the high impact polyolefin resin has a melt index of 0.1 to 5.0 (g/10 min, 230° C./2.16 kg).

4. The composition according to claim 1, wherein the acrylate functional polymer comprises an acrylate copolymer and a polyolefin, wherein the acrylate copolymer is dispersed in the polyolefin.

5. The composition according to claim 1, wherein the acrylate functional polymer has a melt index of 3.0 to 100.0 (g/10 min, 230° C./2.16 kg).

6. The composition according to claim 1, wherein the acrylate functional polymer has a acryl monomer content of 2 to 98% by weight.

7. The composition according to claim 1, wherein the polyolefin-based thermoplastic elastomer comprises at least one elastomer selected from the group consisting of
   (1) ethylene-butene copolymer using a metallocene catalyst, wherein the content of the butene comonomer is 1 to 50 weight percent based on total weight of said ethylene-butene copolymers said ethylene-octene copolymer,
   (2) ethylene-octene copolymer using a metallocene catalyst, wherein the content of the octene comonomer is 1 to 50 weight percent based on total weight of said ethylene-octene copolymer, and
   (3) ethylene-acrylate copolymer, wherein the acrylate comonomer comprises methylacrylate, ethylacrylate, or butylacrylate and the content of the acrylate comonomer is 1 to 50 weight percent based on total weight of ethylene-acrylate copolymer.

8. The composition according to claim 1, wherein the polyolefin-based thermoplastic elastomer has a melt index of 0.1 to 20.0 (g/10 min, 190° C./2.16 kg).

9. The composition according to claim 1, wherein the mineral filler comprises at least one filler selected from the group consisting of talc, calcium carbonate, clay and titanium dioxide.

10. The composition according to claim 1, wherein the lubricant comprises at least one lubricant selected from the group consisting of calcium stearate, zinc stearate, lead stearate and potassium stearate.

11. The composition according to claim 1, wherein the composition comprises 40 to 80 weight percent of the high impact polyolefin resin.

12. The composition according to claim 2, wherein the high impact polyolefin resin is a high impact polypropylene resin.

13. The composition according to claim 1, wherein the composition comprises 5 to 30 weight percent of the acrylate functional polymer.

14. The composition according to claim 1, wherein the acrylate copolymer is a copolymer of butylacrylate, hydroxypropylacrylate and methylmethacrylate, and the acrylate copolymer is dispersed in polypropylene.

15. The composition according to claim 1, wherein the composition comprises 5 to 25 weight percent of the polyolefin-based thermoplastic elastomer.

16. The composition according to claim 7, wherein the polyolefin-based thermoplastic elastomer is an ethylene-methylacrylate copolymer.

17. The composition according to claim 1, wherein the composition comprises 10 to 50 weight percent of the mineral filler.

18. The composition according to claim 1, wherein the high impact polyolefin resin is a high impact polypropylene resin; wherein the acrylate functional polymer is an acrylate copolymer of butylacrylate, hydroxypropylacrylate and methylmethacrylate, and the acrylate copolymer is dispersed in polypropylene; and wherein the polyolefin-based thermoplastic elastomer is an ethylene-methylacrylate copolymer.

19. The composition according to claim 18, wherein the composition is selected from the group consisting of:
   (i) 60 weight % of the high impact polyolefin, 3 weight % of the acrylate functional polymer, and 22 weight % of the polyolefin-based thermoplastic elastomer;
   (ii) 60 weight % of the high impact polyolefin, 10 weight % of the acrylate functional polymer, and 15 weight % of the polyolefin-based thermoplastic elastomer;
   (iii) 60 weight % of the high impact polyolefin, 15 weight % of the acrylate functional polymer, and 10 weight % of the polyolefin-based thermoplastic elastomer; and
   (iv) 60 weight % of the high impact polyolefin, 20 weight % of the acrylate functional polymer, and 5 weight % of the polyolefin-based thermoplastic elastomer.

20. The composition according to claim 18, wherein the high impact polypropylene resin has a melt index of 0.6 (g/10 min, 230° C./2.16 kg) and the ethylene-methylacrylate copolymer has a melt index of 2.4 (g/10 min, 190° C./2.16 kg).

* * * * *